United States Patent
Bekmann et al.

(10) Patent No.: US 9,530,128 B1
(45) Date of Patent: Dec. 27, 2016

(54) PAYMENT INSTRUMENT VERIFICATION TECHNIQUES

(71) Applicant: Square, Inc., San Francisco, CA (US)

(72) Inventors: Joachim Bekmann, San Francisco, CA (US); Nathan David Spindel, San Francisco, CA (US); Rong Yan, Palo Alto, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/455,577

(22) Filed: Aug. 8, 2014

(51) Int. Cl.
| | |
|---|---|
| G06Q 10/00 | (2012.01) |
| G06Q 20/20 | (2012.01) |
| G06Q 20/40 | (2012.01) |
| G06Q 20/32 | (2012.01) |
| G06K 9/00 | (2006.01) |
| G06K 9/18 | (2006.01) |

(52) U.S. Cl.
CPC ........... *G06Q 20/40* (2013.01); *G06K 9/00463* (2013.01); *G06K 9/18* (2013.01); *G06Q 20/202* (2013.01); *G06Q 20/204* (2013.01); *G06Q 20/322* (2013.01); *G06K 2209/011* (2013.01)

(58) Field of Classification Search
USPC .......................................... 705/17
See application file for complete search history.

(56) References Cited

U.S. PATENT DOCUMENTS

| | | | |
|---|---|---|---|
| 2010/0299195 A1* | 11/2010 | Nix | G06Q 20/04 705/14.17 |
| 2013/0346222 A1* | 12/2013 | Ran | G06Q 20/20 705/17 |

* cited by examiner

*Primary Examiner* — Garcia Ade
(74) *Attorney, Agent, or Firm* — Lee & Hayes, PLLC (57) ABSTRACT

Techniques and arrangements for authorizing a payment instrument by capturing an image of the payment instrument at a point-of-sale (POS) device and uploading the image to a payment service, which performs optical character recognition (OCR) on the image to identify an identifier of the payment instrument. The payment service may then use the identifier to authorize the payment instrument for a cost of a transaction performed at the POS device.

26 Claims, 5 Drawing Sheets

PAYMENT INSTRUMENT VERIFICATION TECHNIQUES

BACKGROUND

In today's commerce, merchants often utilize an array of different point-of-sale (POS) devices, including mobile POS devices. Merchants may use these mobile POS devices to engage in transactions with customers at different locations. For instance, a taxi driver may use a mobile POS device to charge a passenger for a taxi ride. In another example, a street vendor may use a mobile POS device to charge a customer for an item purchased from the street vendor.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Some implementations described herein include techniques and arrangements for authorizing a payment instrument by capturing an image of the payment instrument at a point-of-sale (POS) device and uploading the image to a payment service, which performs optical character recognition (OCR) on the image to identify an identifier of the payment instrument. The payment service may then use the identifier to authorize the payment instrument for a cost of a transaction performed at the POS device.

When performing a transaction at a POS device, an operator of the POS device may input an identifier of a payment instrument (e.g., credit card, debit card, etc.) in many ways. For instance, the operator may swipe or dip the instrument in a reader or may manually input an identifier into the device by, for example, typing in a card number along with an expiration date and card verification code (CVC). In the latter instances where the POS-device operator manually keys in the identifier, the customer associated with the payment instrument, along with the payment instrument itself, might not be physically proximate to the POS device. Instead, the customer may have called or otherwise communicated with the operator of the POS device remotely in order to provide the payment-instrument identification for manual entry by the operator. Transactions where the operator manually inputs the identifier of a payment instrument are typically known as "card-not-present" (CNP) transactions, while transactions where the input mechanism provides proof that the card is present at the POS device (e.g., via swiping or dipping of the card) are known as "card-present" (CP) transactions.

Regardless of how the POS device receives the identifier, a payment service may receive, from the POS device, a request to process or authorize a payment instrument along with the corresponding payment-instrument identifier and transaction details (e.g., a cost of the transaction, etc.). The payment service may then attempt to authorize the payment instrument using the received information and may charge a fee to the operator of the POS device for doing so, and/or may charge the fee to another entity. In some instances, an amount of this fee is based at least in part on whether the transaction is a CP transaction or a CNP transaction—or, in other words, whether the card was actually present at the POS device at the time of the transaction. Charging a smaller fee for a CP transaction represents the generally smaller risk of payment fraud for transactions that are performed with the payment instrument present and may also encourage merchants to perform more CP transactions and fewer CNP transactions.

As described below, this application describes another potential way of proving to the payment service that a merchant is indeed in temporary possession of a payment instrument during a transaction. This may be helpful in instances where a POS device lacks a reader, or where the reader is not functioning or able to read the information from the payment instrument (e.g., because the magnetic strip of a credit or debit card is worn out). Specifically, the application describes techniques for allowing a POS device to capture (e.g., via a camera of the device) one or more images of the payment instrument and upload the image(s) to the payment service. Upon receiving the image(s), the payment service may perform optical character recognition (OCR) to recognize the identifier of the payment instrument, potentially among other information (e.g., a card network, an expiration date, and/or a CVC of the payment instrument, whether the payment instrument is a debit, gift, or credit card, and the like).

After determining this information, the payment service may send a request to the operator of the POS device to confirm this information. The operator may then confirm the received identifier and other information against the actual payment instrument itself, or may correct the information. In some instances, meanwhile, the payment service may request that the operator send another picture of the payment instrument, and may indicate a specific perspective, angle, or portion (e.g., the front or back) of the payment instrument to capture. For instance, if the payment service is unable to identify all of the characters in the identifier or needs information located at another portion of the card, then the payment service may send this request to the POS device.

In addition to performing OCR to identify the identifier of the payment instrument, the payment service may analyze the image to determine whether the image itself is fraudulent. For example, the payment service may obtain another image of the card (e.g., from an issuing bank identified by performing the OCR) and may compare this other image to the image received from the POS device. If the images are sufficiently similar (more than a threshold), then the payment service may designate the request as non-fraudulent. If, however, the images differ by more than the threshold amount, then the payment service may refrain from authorizing the transaction and may deem the request as fraudulent.

After performing the OCR to identify the payment-instrument identifier and potentially comparing the image to another image as described above, the payment service may then attempt to authorize the payment instrument for the amount of the transaction. The payment service may then send an indication of whether the payment instrument has been authorized to the POS device. In addition, the payment service may charge a fee to an operator associated with the POS device for performing the authorizing. An amount of this fee may be based on having received the image. For instance, by sending the image of the payment instrument, the payment service may charge a CP-transaction fee that is less than a CNP-transaction fee. This fee may be a flat fee, based on a percentage of the transaction cost (e.g., 1-5% of the cost), or the like. In some instances, the payment service may charge approximately 2.75% of a cost of transaction for CP transactions and approximately 3% for CNP transactions.

Furthermore, in some instances a cost of CP transactions may vary depending on the type and/or amount of verification information provided by the POS device. For instance, if the POS device provides a single piece of information verifying that a payment instrument is present at the POS device—such as information obtained from swiping a card, dipping a card, or capturing an image of a card—then the payment service may charge a CP-transaction fee of 2.75%. If, however, the POS device provides multiple pieces of information verifying the presence of the card—such as information obtained from swiping or dipping a card along with a captured image of the card—then the payment service may charge an even lesser fee, such as less than 2.75%. Similarly, the CP-transaction fee may continue to decrease with an increasing amount of information verifying the presence of the card at the POS device during the transaction.

Furthermore, in some instances an operator of any other type of electronic device may capture an image of a payment instrument and send this information to a payment service or other entity for other reasons. For instance, a user may capture an image of a payment instrument to link to an account of a user such that the user may shop at an online merchant or send money to friends or businesses using the linked payment instrument. In one example, a user is able to download an application at an electronic device of the user, capture an image of the payment instrument, and send this image to a provider of the application. The application provider may then perform OCR on the image to determine information from the payment instrument, such as a name of the user, an identifier (e.g., card number) of the payment instrument, expiration date, CVC, etc. The application provider may then create an account for the user based on this information, and the user may begin transferring money or purchasing items using the linked payment instrument.

For discussion purposes, some example implementations are described below with reference to the corresponding figures. However, implementations herein are not limited to the particular examples provided, and may be extended to other environments, other system architectures, other types of merchants, and so forth, as will be apparent to those of skill in the art in light of the disclosure herein.

Figure 1:
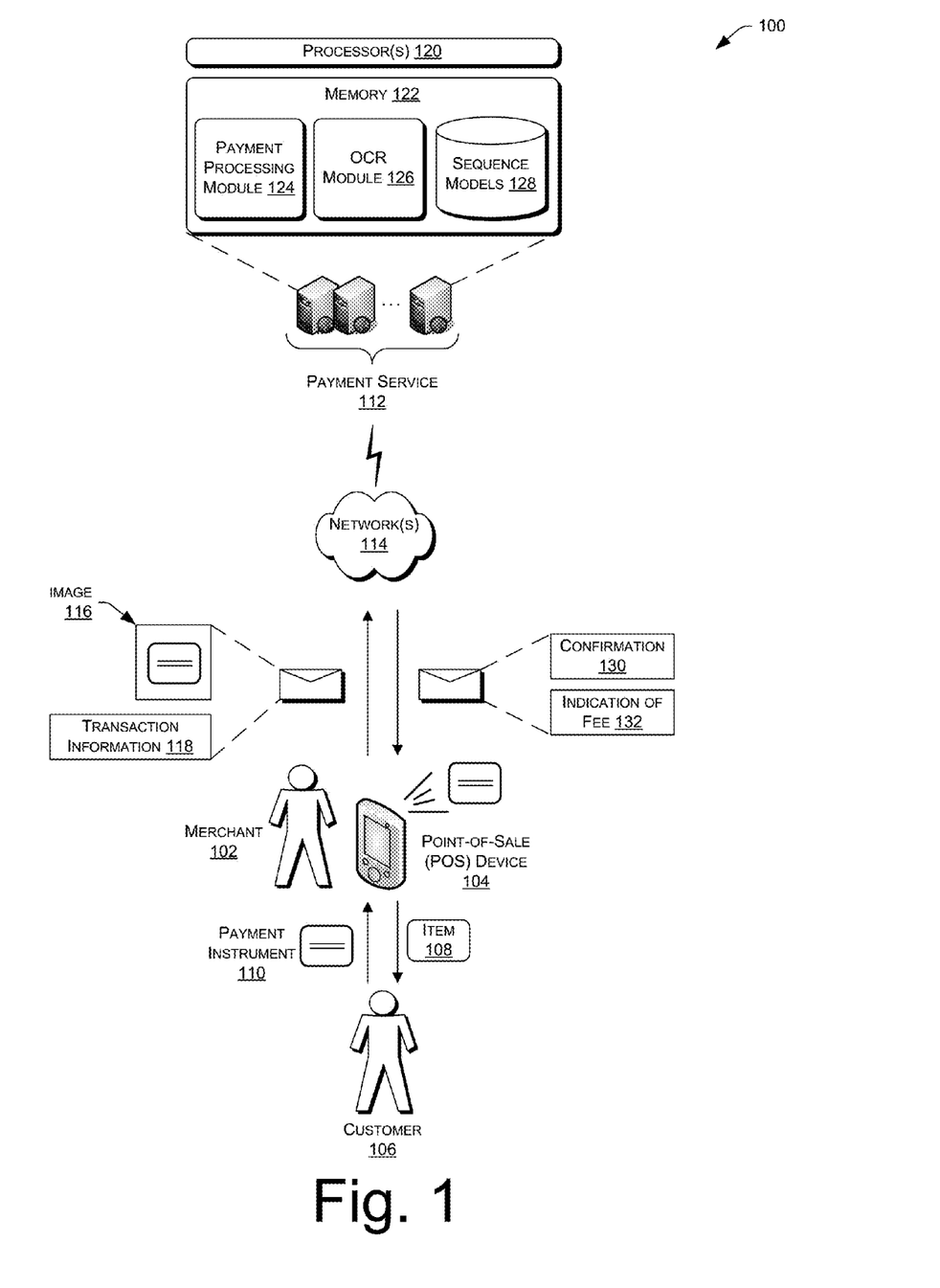
FIG. 1 illustrates an example environment that includes a merchant operating a mobile point-of-sale (POS) device to conduct transactions with customers. The mobile POS device may include a reader to swipe or dip payment instruments, a touch screen or keyboard to manually input an identifier of a payment instrument, and a camera to capture an image of a payment instrument for providing the image to a payment service for authorizing the payment instrument.

FIG. 1 illustrates an example environment 100 that includes a merchant 102 operating a mobile point-of-sale (POS) device 104 to conduct transactions with customers, such as example customer 106. The mobile POS device 104 may include a reader to swipe or dip payment instruments, a touch screen or keyboard to manually input an identifier of a payment instrument, and a camera to capture an image of a payment instrument for providing the image to a payment service for authorizing the payment instrument, as described in further detail below.

Figure 4:
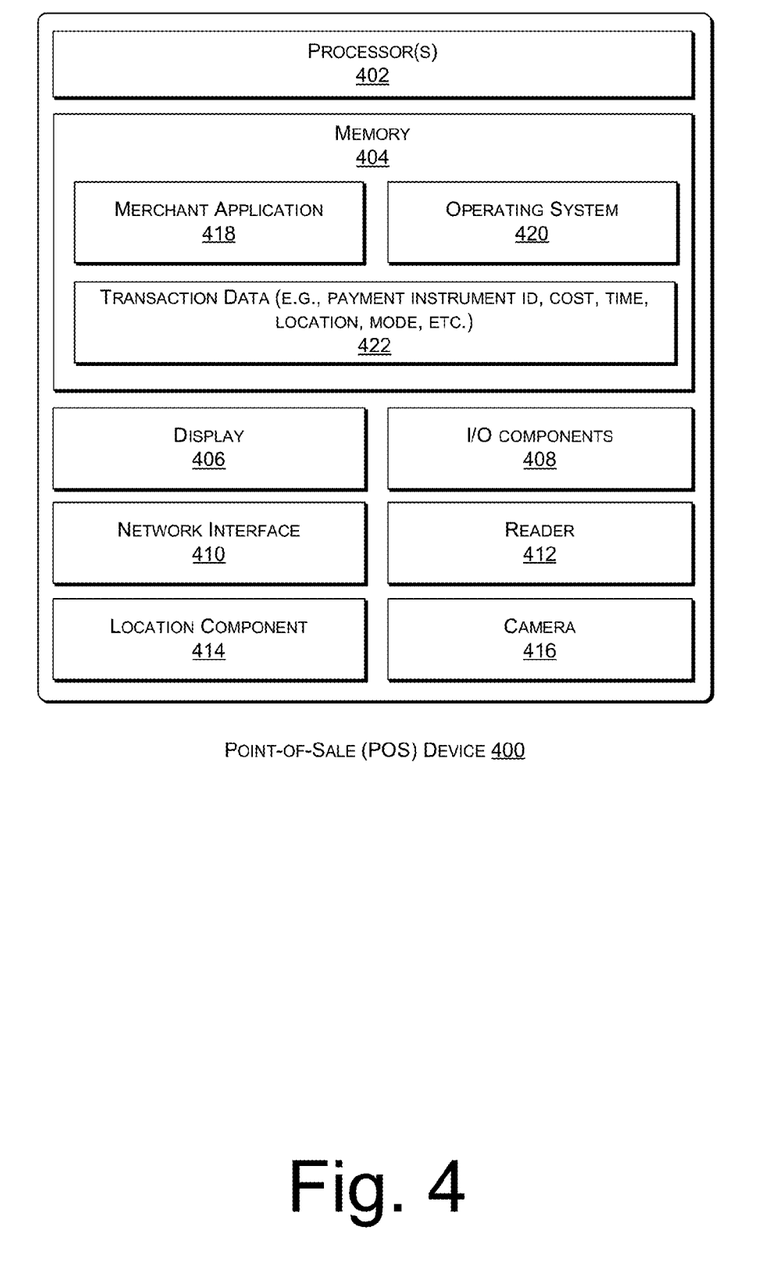
FIG. 4 illustrates select components of a POS device that a merchant described herein may utilize.

The POS device 104 may comprise any sort of mobile or non-mobile device that includes an instance of a merchant application that executes on the respective device (as illustrated in FIG. 4). The merchant application may provide POS functionality to the POS device 104 to enable the merchant 102 (e.g., an owner, employees, etc.) to accept payments from the customers. In some types of businesses, the POS device 104 may correspond to a store or other place of business of the merchant, and thus, may be a fixed location that typically does not change on a day-to-day basis. In other types of businesses, however, the POS device 104 may change from time to time, such as in the case that the merchant operates a food truck, is a street vendor, a cab driver, etc., or has an otherwise mobile business, e.g., in the case of merchants who sell items at buyer's homes, places of business, and so forth.

As used herein, a merchant may include any business engaged in the offering of goods or services for acquisition by customers. Actions attributed to a merchant may include actions performed by owners, employees, or other agents of the merchant and thus no distinction is made herein unless specifically discussed. Furthermore, the terms operator of the POS device and merchant may be used interchangeably herein. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires an item from a merchant, and in return, the customer provides payment to the merchant.

As used herein, a transaction may include a financial transaction for the acquisition of goods and/or services that is conducted between a customer and a merchant. For example, when paying for a transaction, the customer can provide the amount that is due to the merchant using a payment instrument (e.g., a debit card, a credit card, a stored-value or gift card, a check, through an electronic payment application on a device carried by the customer, or the like). The merchant can interact with the POS device 104 to process the transaction, such as by inputting (e.g., manually, by swiping the card via a magnetic card reader or an RFID reader, by dipping the card in a reader, etc.) an identifier associated with the payment instrument. For example, a payment instrument of one of the customers 106 may include one or more magnetic strips for providing card and customer information when swiped in a card reader. In other examples, other types of payment cards may be used, such as smart cards having a built-in memory chip that is read by the device 104 when the card is "dipped" into the reader, a radiofrequency identification tag, or so forth.

In the example of FIG. 1, the merchant 102 and the customer 106 engage in a transaction for an item 108 offered by the merchant 102. The item may comprise any sort of good or service. As illustrated, the customer 106 provides a payment instrument 110 to the merchant 102 for satisfying a cost of the item 108. In response to receiving the payment instrument 110, in this example the merchant 102 may acquire one or more images of the payment instrument using a camera of the POS device 104. The image may be in lieu of or in addition to the merchant 102 inputting information regarding the payment instrument 110 into the POS device 104 (e.g., manually, via swiping or dipping the payment instrument 110, etc.). In some instances, the merchant acquires an image of the front and back of the payment instrument, while in other instances the merchant may acquire a single image. In still other instances, the merchant 102 may acquire a sequence of images, such as in the form of a video.

During the transaction, the POS device 104 can determine transaction information describing the transaction, such as a cost of the transaction, the item(s) acquired by the customer, a time, place and date of the transaction, and so forth. The POS device 104 can send the transaction information to a payment service 112 over a network 114, either substantially contemporaneously with the conducting of the transaction (in the case of online transactions) or later when the device 104 is in the online mode (in the case offline transactions).

In an offline transaction, the POS device 104 may store one or more characteristics associated with the transaction (i.e., the transaction information), such as a cost of the transaction, a time of day at which the transaction occurred, a day of the week at which the transaction occurred, a location at which the transaction took place, an item that the customer obtained, and the like. After conducting an offline transaction with one of the customers 106, the POS device 104 may provide the stored information to the payment service 112 over the network 114. The network 114 may represent any one or more wired or wireless networks, such as a WiFi network, a cellular network, or the like. In an online transaction, the POS device may send this information to the payment service 112 over the network 114 substantially contemporaneously with the transaction with the customer.

In the illustrated example, the POS device 104 provides both transaction information 118 describing details of the transaction between the merchant 102 and the customer 106, along with the image (or images) 116 of the payment instrument 110 as captured by the POS device 104. The payment service may then analyze the image in order to extract information from the image for the purpose of authorizing the received payment instrument for the cost of the transaction.

As illustrated, the payment service 112 may include one or more processors 120 and memory 122, which may store a payment processing module 124, an optical character recognition (OCR) module 126, and one or more sequence models 128. Upon receiving the transaction information 118 and the image 120 from the POS device 104, the OCR module 126 may perform OCR on the image to identify information associated with the payment instrument 110, such as an identifier of the payment instrument 110 (e.g., a card number, etc.), a brand or card network of the payment instrument 110, an expiration date of the payment instrument 110, a CVC of the payment instrument 110, a class of card (e.g., debit, gift, credit, etc.) and the like. In some instances, the OCR module 126 may use one or more sequence models 128 when attempting to determine information from the image 120. These sequence models 128 may store rules associated with respective types of payment instruments, such as respective card networks, and the like. As discussed below, in some instances the OCR module 126 may additionally or alternatively reside on the POS device 104. For instance, the OCR module 126 may form a portion of a merchant application stored on and executable by the POS device 104. In still other instances, a portion of the OCR module 126 may reside at the payment service 112 while another portion of the module 126 may reside at the POS device 104.

A first card network, for instance, may dictate certain rules regarding character sequences of identifiers of payment instruments of this card network. A second card network, meanwhile, may dictate certain different rules regarding character sequences of identifiers of payment instruments of this second card network. As such, the OCR module 126 may, after identifying information about a particular payment instrument (such as the card network), use the corresponding sequence model when performing OCR on another portion of the image, such as the identifier. To illustrate, if the OCR module 126 determines that the payment instrument 110 comprises a Mastercard®, then the OCR module 126 may reference sequence models corresponding to this card network to assist in determining the card number of the card. This sequence module may indicate that the first number is, for example, to begin with a "5" since the card is a Mastercard® and, therefore, that the first number must be a "5". Further, the OCR module 126 may train the sequence module with information derived from the image 120, knowing that the first digit of the identifier in the image is a "5".

After the OCR module 126 identifies information regarding the payment instrument 110 from the image 120, the payment processing module 124 may then use the transaction information 118 and the determined information associated with the payment instrument 110 to attempt to authorize the payment instrument used to conduct the transaction. The payment processing module 124 may then send an indication of whether the payment instrument has been approved or declined back to the POS device 104. The payment processing module 12 may also finalize the transaction using information determined from the OCR process. For instance, the payment processing module 124 may route payment to the merchant via debit or credit networks (or "rails"), depending upon whether the OCR module 126 determined whether the payment instrument was a debit card or credit card, respectively.

Generally, when a customer and a merchant enter into an electronic payment transaction, the transaction is processed by electronically transferring funds from a financial account associated with the customer to a financial account associated with the merchant. As such, the payment processing module 124 may communicate with one or more computing devices of a card network (or "card payment network"), e.g., MasterCard®, VISA®, over the network 114 to conduct financial transactions electronically. The payment processing module 124 can also communicate with one or more computing devices of one or more banks over the network 114. For example, the payment processing module 124 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

After determining whether the payment instrument 110 has been authorized for the transaction, the payment processing module 124 may send an indication to the POS device 104. Here, the payment instrument has been authorized and, hence, the payment processing module 124 sends a confirmation 130 to the POS device 104, along with an indication 132 of a fee that the payment service 112 has charged the merchant 102. In some instances, the amount of this fee is based on having received the image 116. That is, the payment service 112 may use the image 116 as proof that the payment instrument was present at the time of the transaction and, hence, may charge a CP-transaction fee. The CP-transaction fee may be less than a CNP-transaction fee, which the payment service 112 may charge the merchant in instances where the merchant 102 manually enters the identifier without the image.

Figure 2A:
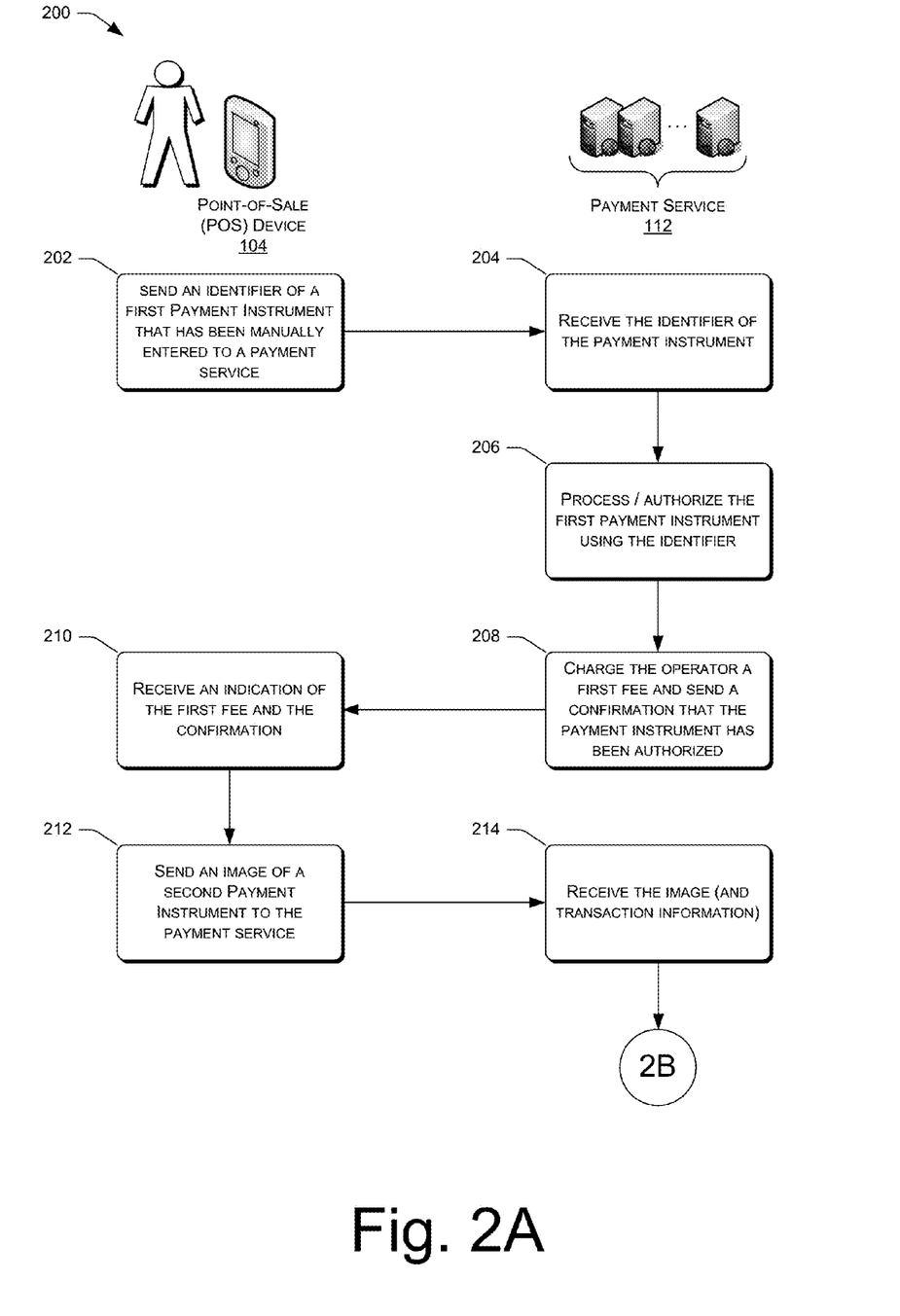
FIGS. 2A-B illustrate a flow diagram of a process for authorizing a payment instrument by capturing an image of the payment instrument.
Figure 2B:
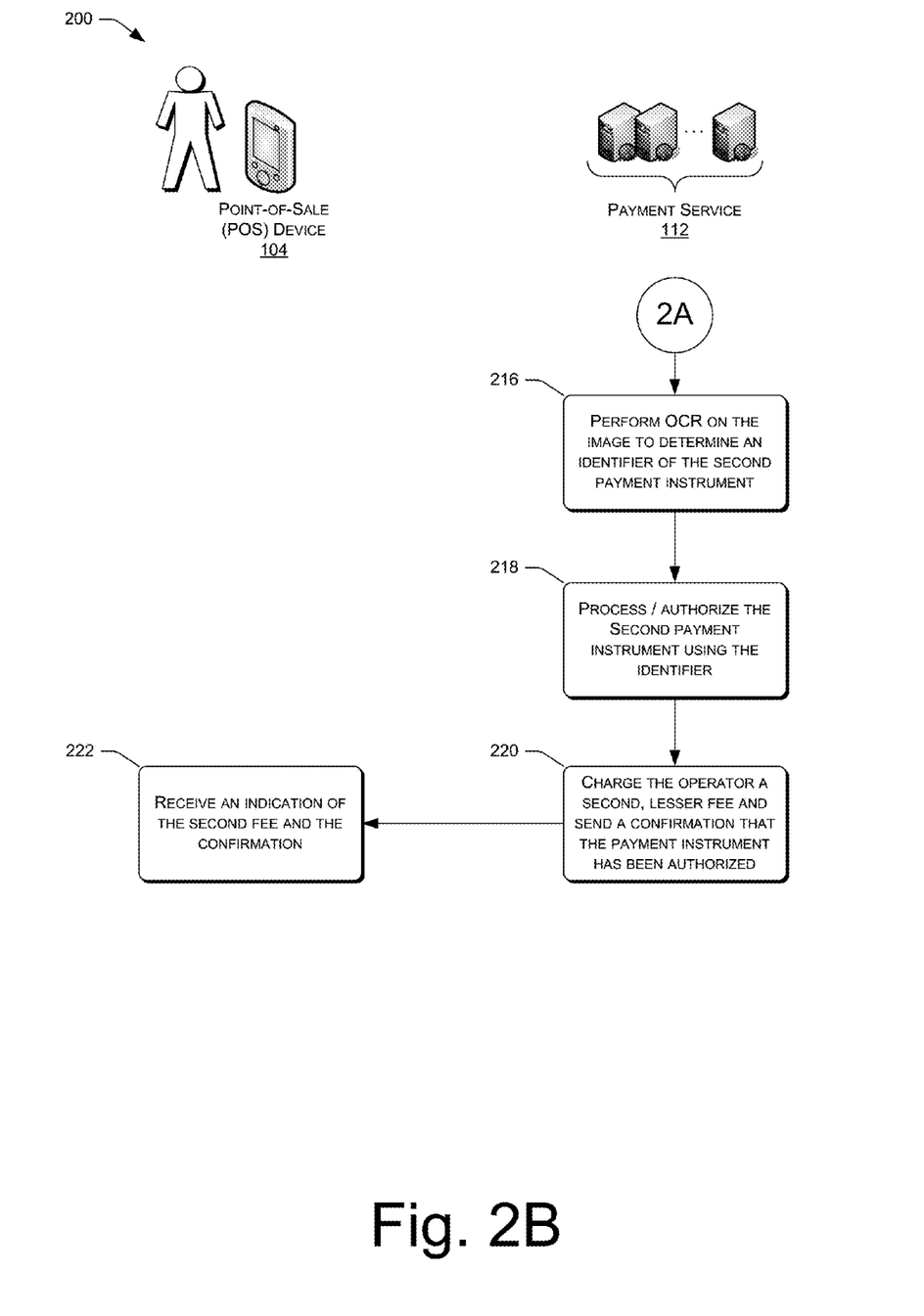

FIGS. 2A-B illustrate a flow diagram of a process 200 for authorizing a payment instrument by capturing an image of the payment instrument. The process 200 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 200, and other processes described herein, may be performed by a POS device, by a remote payment service (e.g., payment service 112), by another entity, or by a combination thereof.

An operation 202 represents the POS device 104 sending an identifier of a first payment instrument to a payment service for authorizing the first payment instrument for a cost of a transaction between the merchant 102 and a customer associated with the first payment instrument. The POS device 104 may also include an indication that the identifier has been manually entered. At 204, the payment service receives the information and, at 206, authorize the payment instrument for the cost of the transaction using the manually-entered identifier. At 208, after authorizing the payment instrument, the payment service 112 charges the merchant a first fee for the authorizing and sends a confirmation to the POS device, which receives the confirmation at 210. In some instances, because the merchant manually entered the identifier of the first payment instrument into the POS device 104 without proof of the card being present at the time of the corresponding transaction, the first fee may comprise a CNP-transaction fee.

At 212, meanwhile, the POS device 104 sends an image of a second payment instrument to the payment service, along with transaction information describing a transaction between the merchant and the same or a different customer. At 214, the payment service 112 receives the image and the information.

FIG. 2B continues the illustration of the process 200 and includes, at 216, the payment service 110 performing OCR on the image to determine an identifier of the second payment instrument. In some instances, the payment service may send, to the POS device, a request for additional images in instances where the payment service is unable to determine the identifier. These requests may specify an angle, perspective, or portion of the payment instrument on which to focus the image. In the instant example, however, the payment service 112 is able to determine the identifier and, at 218, authorizes the second payment instrument for the cost of the transaction.

At 220, the payment service 112 charges the merchant 102 a second fee for authorizing the payment instrument and provides a confirmation to the POS device 104 confirming that the second payment instrument has been authorized and charged. The POS device 102 receives the confirmation at 222. In some instances, the amount of the second fee is based on the payment service 112 having received the image. That is, because the merchant 102 sent proof that the payment instrument was present at the time of the transaction, the payment service 112 may charge a CP-transaction fee, which is generally less than the CNP-transaction fee.

Figure 3:
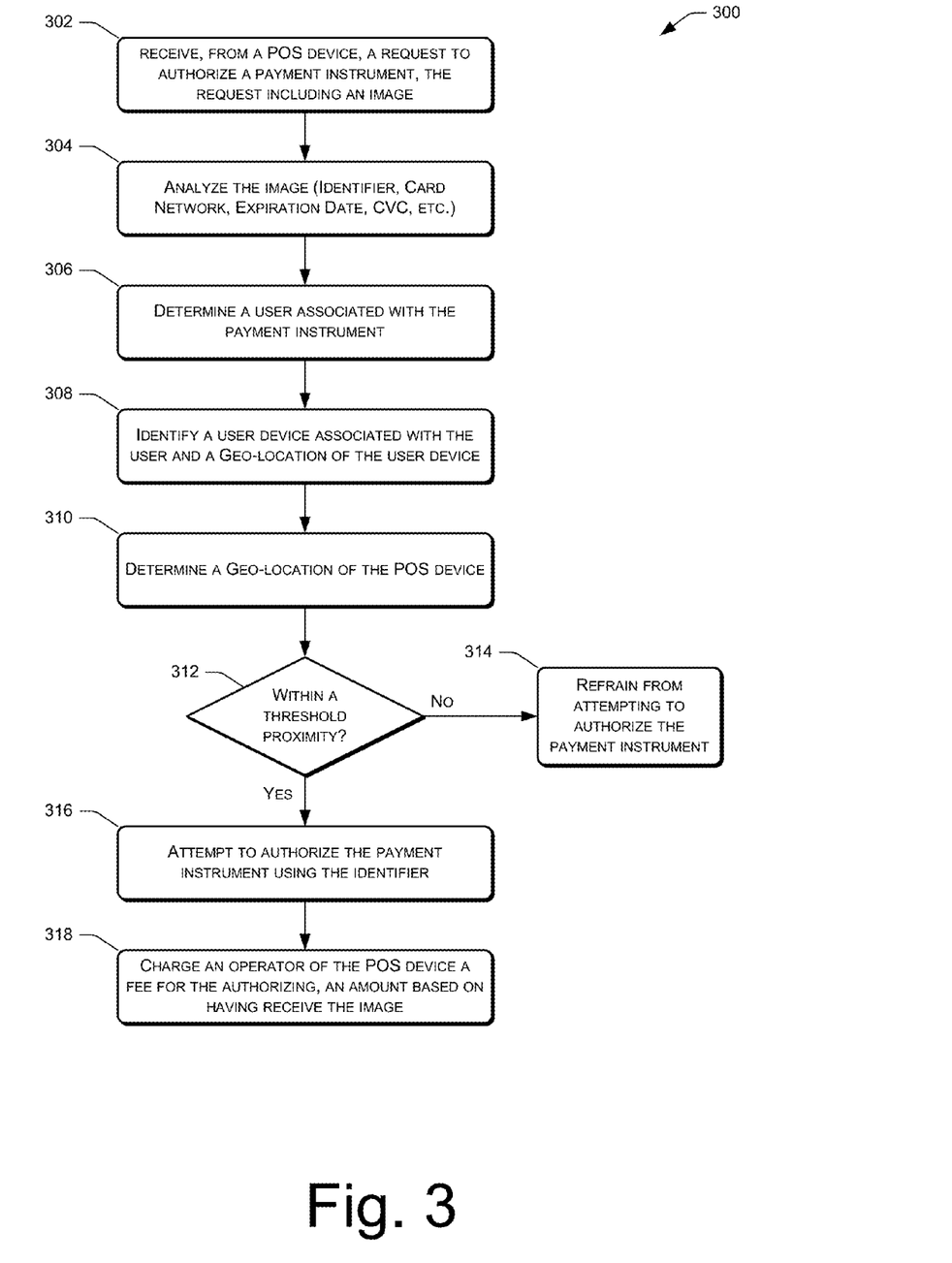
FIG. 3 illustrates another flow diagram of a process for authorizing a payment instrument by capturing an image of the payment instrument.

FIG. 3 illustrates a flow diagram of another process 300 for authorizing a payment instrument by capturing an image of the payment instrument. At 302, the process 300 receives, from a POS device, a request to authorize a payment instrument for a cost of the transaction, with the request including an image of the payment instrument. At 304, the process 300 analyzes the image to determine information associated with the payment instrument, such as an identifier of the payment instrument, an expiration date of the payment instrument, a card network of the payment instrument, a CVC of the payment instrument, or the like.

At 306, the process 300 may determine a user associated with the payment instrument. For instance, where the user (e.g., the customer in the transaction) maintains a user account at the entity performing the process 300, the user account and, hence, the user, may be identified by mapping the determined information of the payment instrument to the user account. After identifying the user and user account, a user device associated with the user may be determined at 308, along with a current geo-location of the user device, such as a phone, tablet computing device, etc. That is, in instances where the user has allowed the sharing of the geo-location of the user's device with the entity (e.g., payment service), the entity may determine a current geo-location of the device. At 310, the process 300 may also determine a current geo-location of the POS device at which the transaction is being conducted, again with (e.g., advanced) consent of the merchant.

At 312, the process 300 determines whether the current geo-location of the user device is within a threshold distance of the current geo-location of the POS device. If so, it is more likely that the image provided by the POS device is in fact a current image of the user's payment instrument, given their proximity to one another, rather than a fraudulently obtained image. If the proximity is not within a threshold distance, then at 314 the process 300 may refrain from attempting to authorize the payment instrument. In other instances, the process 300 may additionally or alternatively contact the user associated with the payment instrument to receive secure and explicit approval to authorize the transaction. If, however, the devices are within the threshold proximity of one another, then at 316 the process 300 attempts to authorize the payment instrument for the cost of the transaction. At 318, the process 300 then charges an operator of the POS device a fee for the authorizing, assuming the payment instrument has been successfully authorized for the cost of the transaction. Again, this fee may be based on having received the image of the payment instrument.

FIG. 4 illustrates select example components of an example POS device 400 according to some implementations. The POS device 400 may be any suitable type of computing device, e.g., mobile, semi-mobile, semi-stationary, or stationary. Some examples of the POS device 400 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the POS device 400 includes at least one processor 402, memory 404, a display 406, one or more input/output (I/O) components 408, one or more network interfaces 410, at least one card reader 412, at least one location component 414, and at least one camera 416. The POS device 400 may also include a power supply and other standard electronic-device components. Each processor 402 may itself comprise one or more processors or processing cores. For example, the processor 402 can be implemented as one or more microprocessors, microcomputers, microcontrollers, digital signal processors, central processing units, state machines, logic circuitries, and/or any devices that manipulate signals based on operational instructions. In some cases, the processor 402 may be one or more hardware processors and/or logic circuits of any suitable type specifically programmed or configured to execute the algorithms and processes described herein. The processor 402 can be configured to fetch and execute computer-readable processor-executable instructions stored in the memory 404.

Depending on the configuration of the POS device 400, the memory 404 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 404 may include, but is not limited to, RAM, ROM, EEPROM, flash memory, solid-state storage, magnetic disk storage, optical storage, and/or other computer-readable media technology. Further, in some cases, the POS device 400 may access external storage, such as RAID storage systems, storage arrays, network attached storage, storage area networks, cloud storage, or any other medium that can be used to store information and that can be accessed by the processor 402 directly or through another computing device or network. Accordingly, the memory 404 may be computer storage media able to store instructions, modules or components that may be executed by the processor 402. Further, when mentioned, non-transitory computer-readable media exclude media such as energy, carrier signals, electromagnetic waves, and signals per se.

The memory 404 may be used to store and maintain any number of functional components that are executable by the processor 402. In some implementations, these functional components comprise instructions or programs that are executable by the processor 402 and that, when executed, implement operational logic for performing the actions and services attributed above to the POS device 400. Functional components of the POS device 400 stored in the memory 404 may include a merchant application 418, discussed above. The merchant application 418 may present an interface on the POS device 400 to enable the merchant to conduct transactions, receive payments, and so forth, as well as communicating with the payment service 102 for processing payments and sending transaction information. Further, the merchant application 418 may present an interface to enable the merchant to manage the merchant's account, and the like. In some instance, the merchant application 418 includes functionality for performing OCR on acquired images such that the OCR techniques described above are instead or additionally performed locally on the POS device 400 (rather than at the payment service 112). In these instances, the POS device may upload the image potentially along with the OCR results to the payment service 112, which may verify the results. That is, the merchant application 418 may additionally or alternatively store some or all of the OCR module 126 for local execution by the POS device 400.

Additional functional components may include an operating system 420 for controlling and managing various functions of the POS device 400 and for enabling basic user interactions with the POS device 400. The memory 404 may also store transaction data 422 that is received based on the merchant associated with the POS device 400 engaging in various transactions with customers, such as the example customer 106 from FIG. 1.

In addition, the memory 404 may also store data, data structures and the like, that are used by the functional components. For example, this data may include item information that includes information about the items offered by the merchant, which may include images of the items, descriptions of the items, prices of the items, and so forth. Depending on the type of the POS device 400, the memory 404 may also optionally include other functional components and data, which may include programs, drivers, etc., and the data used or generated by the functional components. Further, the POS device 400 may include many other logical, programmatic and physical components, of which those described are merely examples that are related to the discussion herein.

The network interface(s) 410 may include one or more interfaces and hardware components for enabling communication with various other devices over the network or directly. For example, network interface(s) 410 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 4 further illustrates that the POS device 400 may include the display 406 mentioned above. Depending on the type of computing device used as the POS device 400, the display 406 may employ any suitable display technology. For example, the display 406 may be a liquid crystal display, a plasma display, a light emitting diode display, an OLED (organic light-emitting diode) display, an electronic paper display, or any other suitable type of display able to present digital content thereon. In some examples, the display 406 may have a touch sensor associated with the display 406 to provide a touchscreen display configured to receive touch inputs for enabling interaction with a graphic interface presented on the display 406. Accordingly, implementations herein are not limited to any particular display technology. Alternatively, in some examples, the POS device 400 may not include the display 406, and information may be present by other means, such as aurally.

The I/O components 408, meanwhile, may include speakers, a microphone, and various user controls (e.g., buttons, a joystick, a keyboard, a keypad, etc.), a haptic output device, and so forth. For instance, the I/O components may include a touch-sensitive display.

In addition, the POS device 400 may include or may be connectable to a payment instrument reader 412. In some examples, the reader 412 may plug in to a port in the merchant device, such as a microphone/headphone port, a data port, or other suitable port. In other instances, the reader 412 is integral with the entire POS device 400. The reader may include a read head for reading a magnetic strip of a payment card, and further may include encryption technology for encrypting the information read from the magnetic strip. The reader may alternatively or additionally include a read head for reading a chip from a payment instrument that has been dipped into the reader 412. Alternatively, numerous other types of card readers may be employed with the POS devices 400 herein, depending on the type and configuration of a particular POS device 400.

The location component 414 may include a GPS device able to indicate location information, or the location component 414 may comprise another other location-based sensor. The POS device 400 may also include any number of still cameras or video cameras 416 that may obtain one or more images of payment instruments for providing these images to a payment service, as described above. As used herein, providing an image to the payment service may include providing a still image captured by a camera and/or providing video (i.e., a sequence of images) captured by a video camera.

The POS device 400 may also include one or more additional sensors (not shown), such as an accelerometer, gyroscope, compass, proximity sensor, and the like. Additionally, the POS device 400 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
   receiving, at a mobile point-of-sale (POS) device that includes a memory, an identifier of a first payment instrument, wherein the identifier is manually entered into the mobile POS device using at least one of a touch screen or a keyboard of the mobile POS device;
   storing the identifier in the memory of the mobile POS device;
   providing, from the mobile POS device to a remote payment service over a network, a first request to authorize the first payment instrument for a cost of a first transaction, the first request indicating the cost of the first transaction, the identifier of the first payment instrument, and that the identifier of the first payment instrument has been manually entered into the mobile POS device, wherein the first request causes the remote payment service to:
      authorize, using the identifier of the first payment instrument, the first payment instrument for the cost of the first transaction;
      determine a first fee based on the authorizing of the first payment instrument, the first fee determined based on the first request indicating that the identifier of the first payment instrument has been manually entered into the mobile POS device;
      charge the operator of the mobile POS device the first fee based on the authorizing of the first payment instrument;
   capturing, at the POS device, one or more images of a second payment instrument, wherein the one or more images are captured using a camera of the mobile POS device;
   storing the one or more images of a second payment instrument in the memory of the POS device; and
   providing, from the mobile POS device to the remote payment service over the network, a second request to authorize the second payment instrument for a cost of a second transaction, the second request indicating the cost of the second transaction and including the one or more images of the second payment instrument, wherein the second request causes the remote payment service to:
      perform optical character recognition (OCR) on the one or more images to determine an identifier of the second payment instrument;
      authorize, using the identifier of the second payment instrument, the second payment instrument for the cost of the second transaction;
      determine a second fee based on the authorizing of the second payment instrument, the second fee determined to be less than the first fee based on the second request including the one or more images of the second payment instrument captured by the mobile POS device; and
      charge the operator of the mobile POS device the second fee based on the authorizing of the second payment instrument.

2. A method as recited in claim 1, further comprising:
   sending, to the mobile POS device, an indication of the identifier determined via the OCR; and
   receiving, from the mobile POS device, a confirmation of the identifier determined via the OCR,
   wherein the authorizing of the second payment instrument is based at least in part on receiving the confirmation.

3. A method as recited in claim 1, wherein the performing OCR further comprises performing OCR on the one or more images to determine a card network associated with the second payment instrument and an expiration date of the second payment instrument.

4. A method implemented by a payment service, the method comprising:
   at the payment service comprising one or more processors and a memory, the memory comprising a payment processing module and an optical character recognition (OCR) module:
      receiving, from a point-of-sale (POS) device, a request to authorize a payment instrument for a cost of a transaction, the request including one or more images of the payment instrument acquired by a camera of the POS device while the payment instrument is present at the POS device at a time of the transaction;

performing, by the OCR module, OCR on the one or more images to determine an identifier of the payment instrument;

authorizing, by the payment processing module using the identifier of the payment instrument, the payment instrument for the cost of the transaction;

determining, by the payment processing module, a first fee based on the authorizing of the payment instrument, the first fee determined based at least in part on the request including the one or more images of the payment instrument acquired by the POS device, wherein the first fee is less than a second fee associated with the payment instrument not being present at the POS device at the time of the transaction; and charging an operator of the POS device the first fee based on the authorizing of the payment instrument.

5. A method as recited in claim 4, wherein the request comprises a first request, the payment instrument comprises a first payment instrument, the transaction comprises a first transaction, and further comprising:

receiving, from the POS device, a second request to authorize a second payment instrument for a cost of a second transaction, the second request comprising an identifier of the second payment instrument and indicating that the identifier of the second payment instrument has been manually entered into the POS device, the second request not including an image of the second payment instrument;

authorizing, using the identifier of the second payment instrument, the second payment instrument for the cost of the second transaction; and charging the operator of the POS device the second fee based on the authorizing of the second payment instrument.

6. A method as recited in claim 4, further comprising:

sending, to the POS device, an indication of the identifier determined via the OCR; and receiving, from the POS device, a confirmation of the identifier determined via the OCR;

and wherein the authorizing of the payment instrument is based at least in part on receiving the confirmation.

7. A method as recited in claim 4, wherein the performing further comprises performing the OCR on the one or more images, or another image of the payment instrument, to determine a card network associated with the payment instrument.

8. A method as recited in claim 4, wherein the performing further comprises performing the OCR on the one or more images, or another image of the payment instrument, to determine an expiration date associated with the payment instrument.

9. A method as recited in claim 4, wherein the performing further comprises performing the OCR on the one or more images, or another image of the payment instrument, to determine a card verification code (CVC) associated with the payment instrument.

10. A method as recited in claim 4, wherein the performing further comprises performing the OCR on the one or more images, or another image of the payment instrument, to determine a card network associated with the payment instrument, and wherein the identifier is determined based at least in part on information regarding number sequences issued by the determined card network.

11. A method as recited in claim 4, further comprising:

determining a user device associated with the payment instrument;

determining a current geo-location of the user device;

determining a current geo-location of the POS device; and comparing the current geo-location of the user device to the current geo-location of the POS device to determine whether the POS device and the user device are within a threshold proximity of one another;

and wherein the authorizing is further based at least in part on determining that the POS device and the user device are within the threshold proximity of one another.

12. A system comprising:

one or more processors; and one or more computer-readable media storing computer-executable instructions that, when executed on the one or more processors, cause the one or more processors to perform acts comprising:

receiving, from a point-of-sale (POS) device, a request to authorize a payment instrument for a transaction, the request including an image of the payment instrument acquired by the POS device while the payment instrument is present at the POS device at a time of the transaction;

analyzing the image to determine an identifier of the payment instrument;

authorizing, by a payment processing module using the identifier of the payment instrument, the payment instrument for the transaction;

determining, by the payment processing module, a first fee based on the authorizing of the payment instrument, the first fee determined based at least in part on the request including the image of the payment instrument acquired by the POS device, wherein the first fee is less than a second fee associated with the payment instrument not being present at the POS device at the time of the transaction; and charging an operator of the POS device the first fee based on the authorizing of the payment instrument.

13. The system as recited in claim 12, wherein the image is acquired by a camera of the POS device.

14. The system as recited in claim 12, wherein the analyzing comprises performing optical character recognition (OCR) on the image.

15. The system as recited in claim 12, wherein the request comprises a first request, the payment instrument comprises a first payment instrument, and the acts further comprising:

receiving, from the POS device, a second request to authorize a second payment instrument, the second request comprising an identifier of the second payment instrument and indicating that the identifier of the second payment instrument has been manually entered into the POS device, the second request not including an image of the second payment instrument;

authorizing, using the identifier of the second payment instrument, the second payment instrument; and charging the operator of the POS device the second fee based on the authorizing of the second payment instrument.

16. The system as recited in claim 12, the acts further comprising:

sending, to the POS device, an indication of the identifier; and receiving, from the POS device, a confirmation of the identifier;

and wherein the authorizing of the payment instrument is based at least in part on receiving the confirmation.

17. The system as recited in claim 12, wherein the analyzing further comprises analyzing the image, or another image of the payment instrument, to determine a card network associated with the payment instrument.

18. The system as recited in claim 12, wherein the analyzing further comprises analyzing the image, or another image of the payment instrument, to determine an expiration date associated with the payment instrument.

19. The system as recited in claim 12, wherein the analyzing further comprises analyzing the image, or another image of the payment instrument, to determine a card verification code (CVC) associated with the payment instrument.

20. The system as recited in claim 12, wherein the analyzing further comprises analyzing the image, or another image of the payment instrument, to determine a card network associated with the payment instrument, and wherein the identifier is determined based at least in part on information regarding character sequences issued by the determined card network.

21. The system as recited in claim 12, the acts further comprising:
   determining a user device associated with the payment instrument;
   determining a current geo-location of the user device;
   determining a current geo-location of the POS device; and
   comparing the current geo-location of the user device to the current geo-location of the POS device to determine whether the POS device and the user device are within a threshold proximity of one another;
   and wherein the authorizing is further based at least in part on determining that the POS device and the user device are within the threshold proximity of one another.

22. An apparatus comprising:
   a reader to receive a payment instrument for satisfying a cost of a transaction;
   a camera to capture an image of the payment instrument;
   one or more processors; and
   one or more computer-readable media storing computer-executable instructions that, when executed by the one or more processors, cause the one or more processors to perform acts comprising:
      capturing the image of the payment instrument using the camera while the payment instrument is present at the apparatus at a time of the transaction;
      sending the image of the payment instrument to a payment service for authorizing the payment instrument for the cost of the transaction, the payment service performing optical character recognition (OCR) on the image to determine an identifier of the payment instrument;
      receiving, from the payment service, an indication that the payment service successfully authorized the payment instrument for the cost of the transaction; and
      receiving, from the payment service, an indication of a first fee associated with the authorizing of the payment instrument, the first fee determined based at least in part on the sending the image of the payment instrument captured by the camera, wherein the first fee is less than a second fee associated with the payment instrument not being present at the apparatus at the time of the transaction.

23. An apparatus as recited in claim 22, the acts further comprising receiving a request from the payment service to capture and send another image of the payment instrument.

24. An apparatus as recited in claim 22, the acts further comprising receiving a request from the payment service to capture and send another image of the payment instrument, the request indicating a specific perspective or angle at which to capture the image or indicating a specific portion of the payment instrument to capture.

25. An apparatus as recited in claim 22, the acts further comprising:
   receiving, from the payment service, a request to confirm the identifier of the payment instrument determined by the payment service via the OCR on the image; and
   responsive to receiving a selection confirming the identifier, sending, to the payment service, an indication that the identifier is confirmed.

26. An apparatus as recited in claim 22, wherein the first fee is based at least in part on the apparatus sending the image rather than sending a manually-entered identifier of the payment instrument.

* * * * *